United States Patent [19]
Butler

[11] 3,731,705
[45] May 8, 1973

[54] FLUID COUPLING
[75] Inventor: Joseph W. Butler, Elyria, Ohio
[73] Assignee: Lear-Siegler Inc., Maple Heights, Ohio
[22] Filed: May 6, 1970
[21] Appl. No.: 35,136

[52] U.S. Cl. ............................................137/614.06
[51] Int. Cl. ..............................................F16l 29/00
[58] Field of Search..................137/614.02, 614.04, 137/614.06, 614, 614.01, 614.03, 614.05, 614.11

[56] References Cited

UNITED STATES PATENTS

| 3,314,447 | 4/1967 | Collar et al. | 137/614.06 |
| 3,474,827 | 10/1969 | Torres | 137/614.06 |
| 3,446,245 | 5/1969 | Snyder | 137/614.03 |
| 3,330,299 | 7/1967 | Slawinski | 137/614.11 |
| 3,130,749 | 4/1964 | Wittren | 137/614.11 |
| 2,931,668 | 4/1960 | Baley | 137/614.04 |
| 3,191,972 | 6/1965 | Collar | 137/614.04 |
| 3,167,092 | 1/1965 | Kelly | 137/614.06 |

Primary Examiner—Martin P. Schwadron
Attorney—Donnelly, Maky, Renner & Otto

[57] ABSTRACT

Fluid coupling consists of two separable coupling parts each containing a valve for controlling fluid flow therethrough. A single locking device locks the coupling parts together, and the fluid coupling operations are interlocked to permit only one operation at a time in the correct sequence preventing opening of the valves prior to locking the coupling parts together and requiring closing of the valves and breaking of the intercoupling seal prior to unlocking.

20 Claims, 3 Drawing Figures

Patented May 8, 1973
3,731,705
2 Sheets-Sheet 1
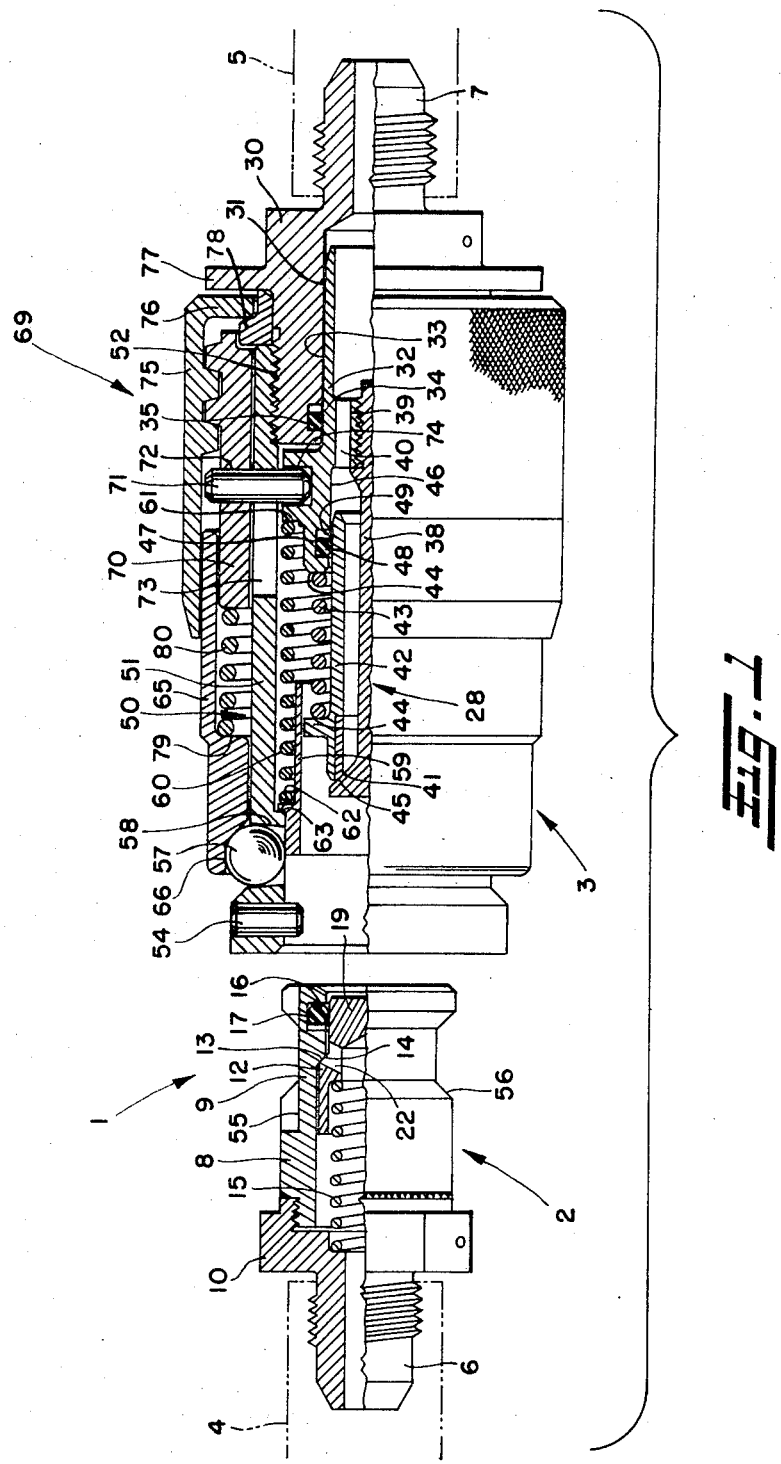
INVENTOR.
JOSEPH W. BUTLER
BY
Oberlin, Maky, Donnelly & Renner
ATTORNEYS Patented May 8, 1973
3,731,705
2 Sheets-Sheet 2
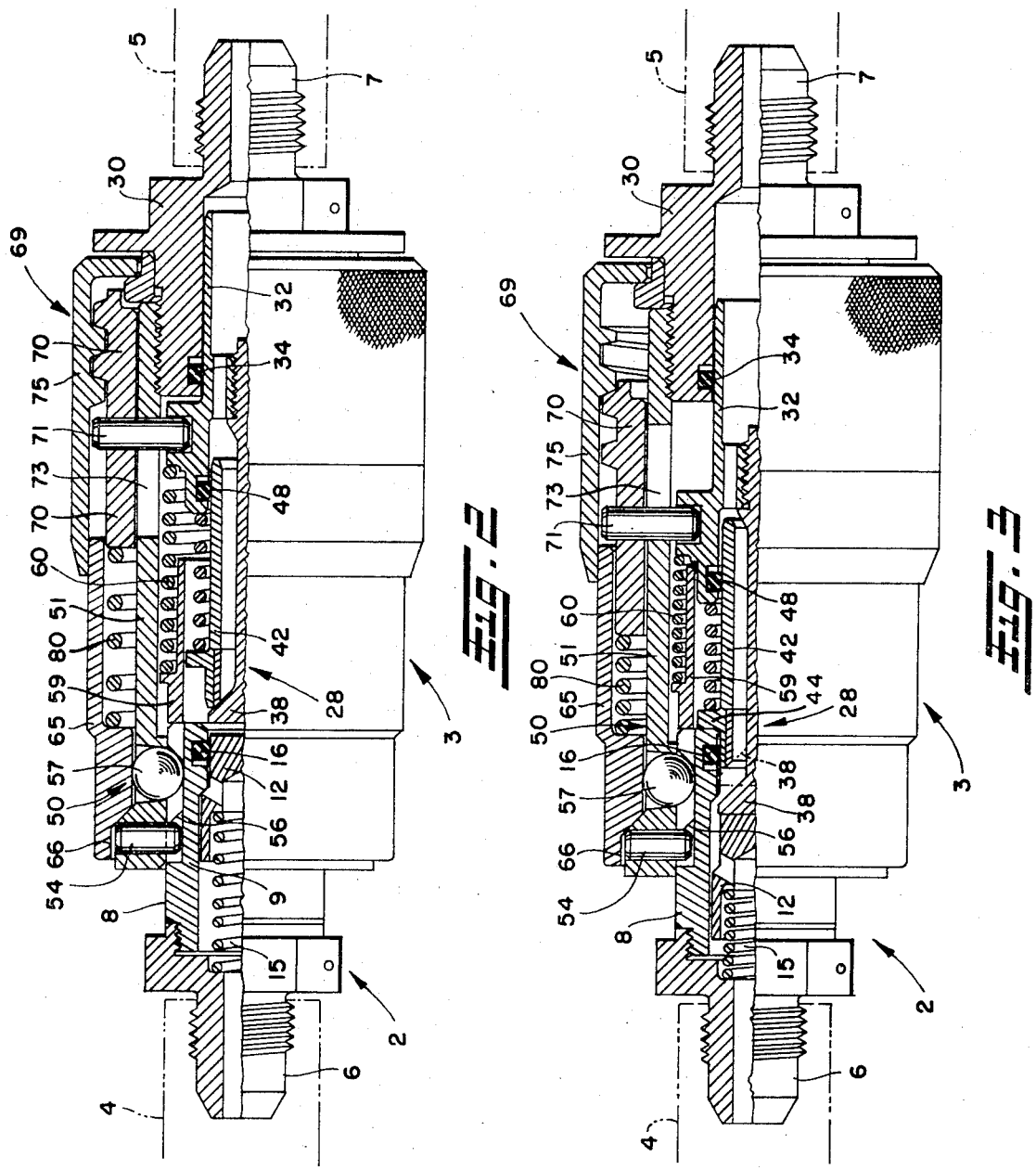
INVENTOR.
JOSEPH W. BUTLER
BY
Oberlin, Maky, Donnelly & Renner
ATTORNEYS

3,731,705

FLUID COUPLING

BACKGROUND OF THE INVENTION

This invention relates generally as indicated to a fluid coupling of a relatively simple and compact design which is highly reliable for use in connecting and disconnecting fluid lines containing high pressure gas, oil, exotic propellants or other transferable fluids under full operating pressures without being subjected to the safety hazards usually present in operations of this type.

Heretofore, it has been the usual practice to provide special valving for high pressure lines to permit draining of one of the fluid lines to obtain reduced pressures in the region of the coupling prior to connecting or disconnecting the coupling. Fluid seals were also generally established between the coupling halves prior to locking the coupling halves together, which meant that the coupling force had to be sufficient to open the valves of each coupling half under pressure. Other methods were also used for special applications which required complicated interlocks, balancing of seal diameters, and other complicated mechanisms in an attempt to overcome the inherent safety hazards involved in the connection and disconnection of fluid lines under high pressure or containing dangerous fluids.

SUMMARY OF THE INVENTION

With the foregoing in mind, it is a principal object of this invention to provide a relatively simple, low-cost fluid coupling for connecting and disconnecting fluid lines containing high pressure or dangerous fluids without having to drain or de-pressurize the fluid lines.

Another object is to provide such a fluid coupling which is relatively easy to maintain and repair and is highly reliable.

A further object is to provide a fluid coupling which gives an audible or visual indication of valve closing.

Another object is to provide such a fluid coupling which eliminates the normal safety hazards that are usually present in critical connection and disconnection operations of this type.

A further object is to provide such a fluid coupling which permits line connection with minimum air or external environment inclusion within the line and disconnection with minimum fluid loss or spillage of internal fluid.

Yet another object is to provide such a fluid coupling which eliminates undesirable reaction forces during connection and disconnection of the fluid coupling.

These and other objects of the present invention may be achieved by using a fluid coupling having two separable coupling parts, each containing its own valve for controlling fluid flow through the line associated therewith. A single locking device is provided for locking the coupling parts together, and the fluid coupling operations are interlocked to permit only one operation at a time in the correct sequence to eliminate unwanted reaction forces during coupling and also eliminate the safety hazards normally associated with a coupling containing an open valve or failed seal during uncoupling.

During coupling, the coupling parts are first locked together before the intercoupling seal between parts is established and the valves are opened. Should the sequencing mechanism be forceably overcome and the valve opening mechanism actuated prior to connecting the coupling parts together, the valves will remain closed, and the coupling parts are prevented from being connected together until the valve opening mechanism is returned to its proper position.

During uncoupling, the valves must be closed and the intercoupling seal broken prior to disconnecting the locking device. Should one of the valves malfunction and remain open, a visual or audible check by the operator will detect the escape of any fluid from the coupling, which may be promptly eliminated by returning the valve opening mechanism to the full open position to reestablish the intercoupling seal between coupling parts. Since the locking device is never engaged or disengaged under load, the coupling may be manually operated at very high internal pressures without any brinelling of sealing surfaces. There are also very few seals for increased reliability, and seals and sealing surfaces are protected during all phases of coupling operation to prevent external leakage of toxic fluids due to seal or sealing surface damage. Accidental connection of fluid lines containing noncompatible fluids is also prevented.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a fragmentary longitudinal section through a preferred form of fluid coupling constructed in accordance with the present invention, showing the coupling halves disconnected from each other;

FIG. 2 is a fragmentary longitudinal section of the fluid coupling similar to FIG. 1, but showing the coupling halves locked together with the respective valves still closed; and FIG. 3 is a fragmentary longitudinal section of the fluid coupling shoing the valve halves connected together and the respective valves in the open position.

DESCRIPTION OF THE PREFERRED EMBODIMENT

Referring now in detail to the drawing, and first especially to FIG. 1, a preferred form of fluid coupling in accordance with this invention is generally indicated by the reference numeral 1 and consists of two main coupling parts or halves 2 and 3 adapted to be connected together and disconnected in a manner to be subsequently fully described for providing selective fluid communication between a pair of fluid lines or conduits 4 and 5 which may have threaded attachment with end fittings 6 and 7 on the respective coupling parts. The fluid coupling 1 is primarily designed for use in supplying high pressure gas, oil, exotic propellants or other dangerous fluids to aircraft or the like, thus necessitating that the fluid coupling and particularly the coupling part 2 which is usually attached to the aircraft, be made highly reliable.

The coupling part 2 is desirably in the form of a nipple assembly 8 having a generally cylindrical body portion 9, with a flange 10 at one end to facilitate mounting to a support structure.

Contained within the cylindrical body 9 of the coupling part 2 is a valve poppet 12 having an external tapered shoulder 13 thereon intermediate its length which is urged into engagement with an internal seat or shoulder 14 on the inner wall of the cylindrical body 9 by a poppet spring 15 interposed between the end fitting 6 and valve poppet 12. An intercoupling seal 16 in the form of an O-ring received in an internal groove 17 adjacent the forward end of the cylindrical body 9 has sealed engagement with the forward end 19 of the valve poppet 12 when in the forwardmost position shown in FIG. 1, and sufficient force is exerted on the valve poppet 12 by the poppet spring 15 to keep the poppet valve in seated position under the intercoupling seal 16 when the fluid coupling is in the disconnected position. Because the coupling part 2 is provided with only one moving part, the valve poppet 12, and one seal, it is highly reliable in operation. Flow passages 22 in the valve poppet 12 permit fluid flow through the coupling part 2 when the coupling parts 2 and 3 are locked together and the valve poppet 12 is retracted out of contact with the intercoupling seal 16, in a manner to be subsequently described. During such movement, the valve poppet 12 is guided on its outermost diameter by the internal diameter of the cylindrical body 9 rearwardly of internal shoulder 14.

The other coupling part 3, while considerably more complicated than the coupling part 2, nevertheless has relatively few parts and is quite compact as compared to previous known coupling parts used for similar purposes. Moreover, the coupling part 3 is highly reliable and eliminates the usual safety hazards of previous known fluid couplings during the connection and disconnection operations, as explained hereafter. As shown, the coupling part 3 is in the form of a socket assembly including a socket body 30 from which projects the end fitting 7. A cylindrical bore 31 in the socket body 30 slidably receives a valve assembly 28 including a valve body 32 having an outer cylindrical sealing surface 33 engaged by an annular O-ring seal 34 contained in an internal groove 35 adjacent the forward end of the socket body 30.

The valve body 32 is also hollow and contains a central valve stem 38 having threaded engagement with an internal shoulder 39 on the valve body 32. Flow passages 40 in the shoulder 39 permit fluid flow therethrough. The valve stem 38 extends forwardly of the valve body 32 and is provided with an external tapered seat 41 against which a valve sleeve 42 is urged by a valve sleeve spring 43 interposed between the forward end of the valve body 32 and an external shoulder 44 on the valve sleeve to provide sealed engagement in the zone of contact 45 between the seat 41 and valve sleeve 42 to prevent fluid flow through the socket assembly.

A cylindrical bore 46 in the valve body 32 slidably receives one end of the valve sleeve 42, and an internal groove 47 is provided in such cylindrical bore for receipt of a second annular O-ring seal 48 which has sealed engagement with the outer cylindrical sealing surface 49 of the valve sleeve 42 to prevent fluid leakage between such valve sleeve 42 and valve body 32.

Mounted on the outer surface of the socket body 30 is a locking device 50 comprising a locking device body or sleeve 51 having threaded engagement at 52 with the socket body 30. Carried by the forward projecting end of the locking device body 51 are a plurality of index pins 54 adapted to be received in longitudinal slots 55 in the nipple body 9. By controlling the number and spacing of index pins 54 and mating slots 55, accidental connection of coupling parts of the same line size containing non-compatible fluids is prevented, since unless the index pins 54 in the socket assembly are in the same pattern as the slots 55 in the nipple assembly 8, the coupling parts will not go together.

Also carried by the locking device body 51 are a plurality of locking elements 57 received in radial openings 58 in the locking device 51. Preferably, the locking elements 57 are balls as shown, but it will be apparent that other locking elements such as cams, pins, dogs, or segments may be used. An annular external groove 56 is provided in the nipple body 9 for receipt of the locking elements 57 to lock the coupling parts 2 and 3 together when properly connected together as hereinafter described.

For retaining the locking elements 57 within the radial openings 58 when in the disconnected position shown in FIG. 1, there is provided a retaining ring 59 received within the locking device body 51 and urged into underlying relation with the radial inner ends of the openings 58 by a retainer ring spring 60 disposed between an external shoulder 61 on the valve body 32 and an annular shoulder 62 on the retainer ring 59. The forwardmost position of the retainer ring 59 is determined by engagement of the retainer ring shoulder 62 with an internal shoulder 63 on the locking device body 51. Axially slidable on the exterior of the locking device body 51 is a locking collar 65 having an internal groove 66 adjacent the forward end thereof which receives the locking elements 57 when retained in their radial outermost position by the retainer ring 59.

Also mounted on the locking device body 51 is a valve actuating mechanism 69 including a valve actuating ring 70 surrounding the locking device body. The valve actuating ring 70 is connected to the valve body 32 by radial pins 71 received in radial openings 72 in the valve actuating ring 70 and extending through longitudinal slots 73 in the locking device body 51 into an annular external groove 74 in the valve body. An outer rotatable collar 75 is retained against axial movement on the socket body 30 by an external flange 77 on the socket body 30 and adjacent flange bushing 78 which receive a radially inwardly extending flange 76 on the collar therebetween. The collar 75 has threaded engagement with the valve actuating ring 70, as shown, whereby rotation of the rotatable collar 75 causes axial movement of the valve actuating ring 70 and valve body 32 connected thereto, for a purpose to be subsequently described. Interposed between the forward end of the valve actuating ring 70 and an internal shoulder 79 on the locking collar 65 is a locking collar spring 80 which maintains the locking collar in overlying relation with the locking elements 57.

The details of construction of the fluid coupling 1 having thus been described, its operation will now be set forth.

OPERATION

With the coupling parts 2 and 3 in the disconnected position shown in FIG. 1, either or both coupling parts may be pressurized without interfering with the coupling operation, since the valves of the respective coupling parts remain closed during the coupling operation. To connect the coupling parts together, the indexing pins 54 on the socket assembly 3 are aligned with the longitudinal slots 55 in the nipple assembly 8 and the socket assembly is manually pushed onto the nipple assembly. As the indexing pins 54 enter the longitudinal slots 55 in the nipple assembly 8, the forward end of the nipple body 9 contacts the retainer ring 59, forcing the retaining ring 59 to the rear against the spring 60 bias to permit transfer of the locking elements 57 onto the nipple body 9. Continued movement of the socket assembly 3 onto the nipple assembly 8 brings the locking elements 57 into radial alignment with the locking groove 56 in the nipple body 9, at which time the locking elements 57 are forced radially into the locking groove by the locking collar 65 which is caused to move forward over the locking elements by the locking collar spring 80 as shown in FIG. 2. Now the coupling parts 2 and 3 are locked together, but there is yet no seal therebetween and the respective valves are still closed. Accordingly, it will now be apparent that very little force is required to lock the coupling parts together, and such locking force is also independent of the fluid pressure exerted on the valves.

To open the valves, the valve actuating mechanism 69 is operated by rotation of the outer collar 75 in a direction causing axial outward movement of the valve actuating ring 70 and valve body 32 connected thereto as a unit toward the nipple assembly 8. During each movement of the valve body 32, the forward end of the valve stem 38 is extended into engagement with the valve poppet 12 of the nipple assembly 8, causing the valve poppet 12 to move rearwardly under the intercoupling seal 16 and transfer such seal from the valve poppet 12 to the outer cylindrical sealing surface of the valve sleeve 42 as shown in FIG. 3.

With the valve stem 38 in the position shown in phantom lines in FIG. 3, the valve poppet 12 of the nipple assembly 8 is in the open position but fluid leakage between the nipple body 9 and valve sleeve 42 is prevented by the intercoupling seal 16 engaging the valve sleeve 42 as aforesaid. Moreover, fluid flow between coupling parts is prevented because the valve assembly 28 of the coupling part 3 is still closed. However, continued rotation of the outer collar 75 causes the valve stem 38 to move forwardly relative to the valve sleeve 42 to the solid line position shown in FIG. 3, since continued movement of the valve sleeve 42 is prevented by engagement of the valve sleeve shoulder 44 with the forward end of the nipple body. This opens the valve assembly 32 and permits fluid flow from one coupling part to the other. Full travel of the connecting pins 71 between the valve actuating ring 70 and valve body 32 within the axial slots 73 provided therefor in the locking device body 51 assures complete opening of the valve assembly 32.

Should an attempt be made to operate the valve actuating mechanism 69 prior to locking the coupling parts 2 and 3 together, the retracted condition of the locking collar 65 will permit only limited forward movement of the valve actuating ring 70 and valve body 32 connected thereto. Moreover, even if the retainer ring 59 were forcibly retracted and the locking mechanism 50 actuated without locking the coupling parts together, the valves would still remain closed even if the valve actuating collar 75 were rotated to the full open position, and the socket assembly could not be connected to the nipple assembly until the valve actuating mechanism was again returned to its fully closed position.

Nor can the locking collar 65 be retracted to disconnect the coupling parts when the coupling parts are properly locked together and the valves are in the full open position illustrated in FIG. 3, because of the compressed condition of the locking sleeve spring 80 and the relatively close spacing between the forward end of the valve actuating ring 70 and adjacent shoulder on the locking collar 65. Disconnection of the coupling parts 2 and 3 can only be accomplished by rotating the outer collar 75 in the reverse direction first to retract the valve stem 38 into sealing engagement with the valve sleeve 42 to close the valve assembly 28, and then to retract the valve stem 38 and valve sleeve 42 as a unit, transferring the intercoupling seal 16 from the valve sleeve 42 back to the valve poppet 12 and permitting closing of the valve poppet 12 by the poppet spring 15. Should one of the valves not properly close because of damage or other reason, an audible or visual check by the operator will reveal any leakage from the fluid coupling, and such leakage may be stopped immediately upon returning the valve actuating mechanism 69 to the full open position to retransfer the intercoupling seal 16 back to the valve sleeve 42. In any event, not until the valves 12 and 28 are completely closed and the valve sleeve 42 and valve stem 38 are fully retracted can the locking collar 65 be retracted by hand to disconnect the socket assembly 3 from the nipple assembly 2.

From the foregoing, it can now be seen that the fluid coupling of the present invention is of a relatively simple and compact design which may be used for connecting and disconnecting high fluid pressure lines without the usual safety hazards of conventional fluid couplings. During the connecting function, the coupling parts must first be locked together before the intercoupling seal can be transferred from one valve member to the other and the valves opened, whereby the force required to lock the coupling parts together is completely independent of the force required to open the valves. The valves may also be opened manually even under extremely high internal pressures because of the threaded connection between the outer collar 75 and valve actuating ring 70 which provides a high mechanical advantage, and the dissipation of any internal forces prior to the final disconnect operation. Flats may be placed on the outer collar 75 to permit application of additional force to the collar if necessary, and the fluid seals of each coupling part may be balanced or unbalanced as desired to vary the amount of force required to open and close the valves. The threads on the collar 75 are desirably high lead threads to permit quick seal transfer between valve parts so that there is no loss of fluid into the coupling housing during seal transfer.

The subject fluid coupling design is also highly reliable since there are very few seals, and all of the seals and sealing surfaces are protected during all phases of coupling operation to prevent external leakage of toxic fluids due to seal or sealing surface damage. The coupling part 2 has only one seal, and the coupling part 3 only two seals, and only on locking device is required, which greatly adds to the simplicity and reliability of the fluid coupling. The seals are also contained at all times to prevent seal blowout under high pressure gas operation. Moreover, it will be apparent that the two seals on the socket assembly could be replaced with a bellows if desired, particularly for low pressure applications, for increased reliability.

I, therefore, particularly point out and distinctly claim as my invention:

1. A fluid coupling comprising a pair of coupling parts adapted to be connected together and disconnected, each said coupling part containing a valve, locking means for locking said coupling parts in connected position with said valves in said coupling parts closed to block fluid flow therethrough, whereby the force required to lock said coupling parts together is independent of any internal fluid pressure that may be acting on said valves, and valve actuating means for opening said valves after locking of said coupling parts together to permit fluid flow between said coupling parts, said one coupling part containing an intercoupling seal and said valve of said one coupling part comprising a poppet which is spring biased into underlying relation with said intercoupling seal for preventing fluid flow through said one coupling part, and said valve of said other coupling part comprising a valve stem, a valve sleeve surrounding said valve stem and axially movable with respect thereto, and spring means for biasing said valve sleeve into fluid tight engagement with said valve stem for preventing fluid flow through said other coupling part, said valve actuating means being operative to cause said valve stem and valve sleeve of said other coupling part to move axially into engagement with said poppet of said one coupling part for retracting said poppet from underlying relation with said intercoupling seal and moving said valve sleeve into underlying sealed relation with said intercoupling seal, and means for subsequently permitting continued forward movement of said valve stem relative to said valve sleeve for opening said valve of said other coupling part to permit fluid flow between coupling parts.

2. The fluid coupling of claim 1 wherein said last-mentioned means comprises an external shoulder on said valve sleeve engageable with the forward end of said one coupling part after transfer of said intercoupling seal from said poppet to said valve sleeve for permitting such relative movement of said valve stem with respect to said valve sleeve.

3. The fluid coupling of claim 1 wherein said valve actuating means comprises a valve ring on said other coupling part, means for moving said valve ring axially with respect to said one coupling part, and means connecting said valve ring to said valve stem for axial movement therewith.

4. The fluid coupling of claim 3 wherein said means for moving said valve ring axially comprises a rotatable collar mounted on said other coupling part against axial movement, said rotatable collar having threaded engagement with said valve ring, and means preventing rotation of said valve ring, whereby rotation of said collar causes axial movement of said valve ring.

5. The fluid coupling of claim 3 wherein said locking means comprises a locking sleeve interposed between said valve ring and said valve stem, said locking sleeve having locking elements thereon for providing locking engagement with said one coupling part, and said means connecting said valve ring to said valve stem for axial movement therewith comprises a plurality of radial pins projecting from said valve ring through longitudinal slots in said locking sleeve for receipt in an annular groove in said valve stem.

6. The fluid coupling of claim 1 wherein said intercoupling seal comprises an O-ring seal contained in an internal groove in said one coupling part.

7. The fluid coupling of claim 1 wherein said valve stem includes a body portion slidably received in a bore in said other coupling part, and seal means are provided between the wall of said bore and said body portion of said valve stem, and additional seal means are provided between said body portion of said valve stem and said valve sleeve to preclude fluid leakage from said other coupling part.

8. The fluid coupling of claim 7 wherein said seal means between the wall of said bore and said body portion comprises an annular O-ring seal disposed in an annular groove in one of said bore and body portion of said valve stem, the other of said bore and said body portion of said valve stem having a cylindrical sealing surface engaged by said seal means.

9. The fluid coupling of claim 7 wherein said additional seal means comprises an O-ring seal disposed in an annular groove in one of said body portion of said valve stem and said valve sleeve, and the other of said body portion of said valve stem and said valve sleeve having a cylindrical sealing surface engaged by said additional seal means.

10. A fluid coupling comprising a pair of coupling parts adapted to be connected together and disconnected, each said coupling part containing a valve, locking means for locking said coupling parts in connected position with said valves in said coupling parts closed to block fluid flow therethrough in response to said coupling parts being axially pushed together, whereby the force required to lock said coupling parts together is independent of any internal fluid pressure that may be acting on said valves, and valve actuating means for opening said valves after locking of said coupling parts together to permit fluid flow between said coupling parts, one of said coupling parts having a seal therein in sealed engagement with the valve of said one coupling part when in the closed position, said valve actuating means including rotatable collar means which when rotated in one direction causes a portion of the other coupling part to move axially into sealed engagement with said seal to provide a fluid tight interconnection between said coupling parts.

11. The fluid coupling of claim 10 further comprising means for preventing unlocking of said coupling parts prior to closing of said valves of both coupling parts.

12. The fluid coupling of claim 10 wherein said locking means comprises an external annular groove in one of said coupling parts, and a locking sleeve projecting from the other coupling part for sliding receipt onto said one coupling part, the projecting end of said locking sleeve having a plurality of radial openings therein, a plurality of locking elements received in said radial openings, and retaining means for retaining said locking elements within said radial openings when said coupling parts are disconnected and for urging said locking elements radially inwardly into overlapping engagement with the sides of said external groove in said one coupling part when inserted thereover for locking said coupling parts together.

13. The fluid coupling of claim 12 wherein said retaining means comprises a retaining ring internally of said locking sleeve spring biased into underlying relation with the inner ends of said radial openings, and a spring loaded locking collar externally of said locking sleeve having an internal groove in the forward end for receipt of said locking elements when in their radial outermost positions in said radial openings, said retaining ring being forced out of underlying relation with said radial openings during assembly of said coupling parts to permit said locking collar to force said locking elements radially inwardly into overlapping engagement with the sides of said groove in said one coupling part as aforesaid.

14. The fluid coupling of claim 12 further comprising indexing pins on the projecting portion of said locking sleeve, and mating slots in said one coupling part for receipt of said indexing pins to prevent accidental connection of the wrong coupling parts.

15. The fluid coupling of claim 10 wherein each of said valves has means associated therewith to maintain the same in closed position until the coupling parts are properly locked together and the valve actuating means operated.

16. The fluid coupling of claim 15 wherein the means associated with one of said valves is operative to maintain the same in its closed position until the intercoupling seal between the coupling parts is effected by said valve actuating means.

17. The fluid coupling of claim 10 wherein said valve actuating means further comprises a valve ring on said other coupling part which is moved axially with respect to said one coupling part during rotation of said rotatable collar means, and means connecting said valve ring to said valve of said other coupling part for axial movement therewith.

18. A fluid coupling comprising a pair of coupling parts adapted to be connected together and disconnected, each said coupling part containing a valve, locking means for locking said coupling parts in connected position with said valves in said coupling parts closed to block fluid flow therethrough, whereby the force required to lock said coupling parts together is independent of any internal fluid pressure that may be acting on said valves, valve actuating means for opening said valves after locking of said coupling parts together to permit fluid flow between said coupling parts, and an intercoupling seal on one of said coupling parts having sealed engagement with the valve of said one coupling part when in the closed position, said valve actuating means being operative to cause said valve of said other coupling part to displace said valve of said one coupling part for transferring said intercoupling seal from said valve of said one coupling part to said valve of said other coupling part prior to opening of said valve of said other coupling part to provide a fluid tight seal between coupling parts, said valve actuating means comprising a valve ring on said other coupling part, means for moving said valve ring axially with respect to said one coupling part, and means connecting said valve ring to said valve of said other coupling part for axial movement therewith.

19. A fluid coupling comprising a pair of coupling parts adapted to be connected together and disconnected, each said coupling part containing a valve, locking means for locking said coupling parts in connected position with said valves in said coupling parts closed to block fluid flow therethrough, whereby the force required to lock said coupling parts together is independent of any internal fluid pressure that may be acting on said valves, and valve actuating means for opening said valves after locking of said coupling parts together to permit fluid flow between said coupling parts, said locking means comprising an external annular groove in one of said coupling parts, and a locking sleeve projecting from the other coupling part for sliding receipt onto said one coupling part, the projecting end of said locking sleeve having a plurality of radial openings therein, a plurality of locking elements received in said radial openings, and retaining means for retaining said locking elements within said radial openings when said coupling parts are disconnected and for urging said locking elements radially inwardly into overlapping engagement with the sides of said external groove in said one coupling part when inserted thereover for locking said coupling parts together, said retaining means comprising a retaining ring internally of said locking sleeve spring biased into underlying relation with the inner ends of said radial openings, and a spring loaded locking collar externally of said locking sleeve having an internal groove in the forward end for receipt of said locking elements when in their radial outermost positions in said radial openings, said retaining ring being forced out of underlying relation with said radial openings during assembly of said coupling parts to permit said locking collar to force said locking elements radially inwardly into overlapping engagement with the sides of said groove in said one coupling part as aforesaid, said valve actuating mechanism comprising a valve ring on said other coupling part, means for moving said valve ring axially with respect to said one coupling part, and means connecting said valve ring to said valve of said other coupling part for axial movement therewith.

20. The fluid coupling of claim 19 wherein said locking collar has a shoulder thereon in axial alignment with the forward end of said valve ring, and a spring interposed between said shoulder and valve ring, the relative spacing between said shoulder and valve ring being such that when said valve ring has been moved axially forward to open said valves, retraction of said locking collar to permit disconnection of said coupling parts is prevented.

* * * * *